United States Patent
Berg et al.

(10) Patent No.: US 7,657,870 B2
(45) Date of Patent: Feb. 2, 2010

(54) METHOD AND APPARATUS FOR IMPLEMENTING DYNAMIC FUNCTION GROUPS IN A DATA PROCESSING SYSTEM

(75) Inventors: Daniel Christopher Berg, Cary, NC (US); Vijay Kumar Bhadriraju, Durham, NC (US); Brad Lee Blancett, Raleigh, NC (US); Charles Dyer Bridgham, Cary, NC (US); Jialin C. Chen, Durham, NC (US); Michael Damein Elder, Durham, NC (US); Derek Francis Holt, Durham, NC (US); John David Lanuti, Raleigh, NC (US); Ritchard Leonard Schacher, Cary, NC (US); Jason Ashley Sholl, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 11/065,825

(22) Filed: Feb. 25, 2005

(65) Prior Publication Data
US 2006/0195818 A1      Aug. 31, 2006

(51) Int. Cl.
*G06F 9/44* (2006.01)
(52) U.S. Cl. ........................................... 717/120
(58) Field of Classification Search ............. 705/78–79; 717/120
See application file for complete search history.

(56) References Cited

U.S. PATENT DOCUMENTS

| 6,263,359 | B1 | | 7/2001 | Fong et al. ................. 709/103 |
| 6,996,816 | B1 | * | 2/2006 | Bohan ........................ 717/169 |
| 7,140,001 | B1 | * | 11/2006 | Natori et al. ................. 717/105 |
| 7,409,710 | B1 | * | 8/2008 | Uchil et al. ................... 726/19 |
| 2002/0078361 | A1 | * | 6/2002 | Giroux et al. ............... 713/183 |
| 2002/0138503 | A1 | | 9/2002 | Buesing et al. ............. 707/203 |
| 2003/0120703 | A1 | * | 6/2003 | Ruellan ...................... 709/102 |
| 2003/0196204 | A1 | * | 10/2003 | Thiagarajan et al. .......... 725/61 |
| 2004/0015822 | A1 | * | 1/2004 | Linton et al. ................. 717/104 |
| 2005/0138034 | A1 | * | 6/2005 | Faraj ........................... 707/10 |

OTHER PUBLICATIONS

Seguron, "ProgressTalk.com—problem adding a button in toolbar", http://www.progresstalk.com/showthread.php?t=49512, Sep. 5, 2002, pp. 1-3.

\* cited by examiner

*Primary Examiner*—Wei Y Zhen
*Assistant Examiner*—Junchun Wu
(74) *Attorney, Agent, or Firm*—Kunzler & McKenzie

(57) ABSTRACT

A method, an apparatus, and computer instructions are provided for implementing dynamic function groups in a data processing system. An extensible framework is provided, which provides function groups to amalgamate extended sets of functionality by either vendor or purpose and allows the function groups to be dynamically enabled or disabled within a software application. A user may specify which extended sets of functionality are relevant and when to enable them. With the use of function groups, third party vendors may integrate added functionalities with existing ones in a software application, and indicate when these functionalities should be available to end-users without the need to duplicate code. The invention allows for the construction of other extensible frameworks including wizards, editors, and operations may also be extended with the use of function groups.

10 Claims, 5 Drawing Sheets

FIG. 4A

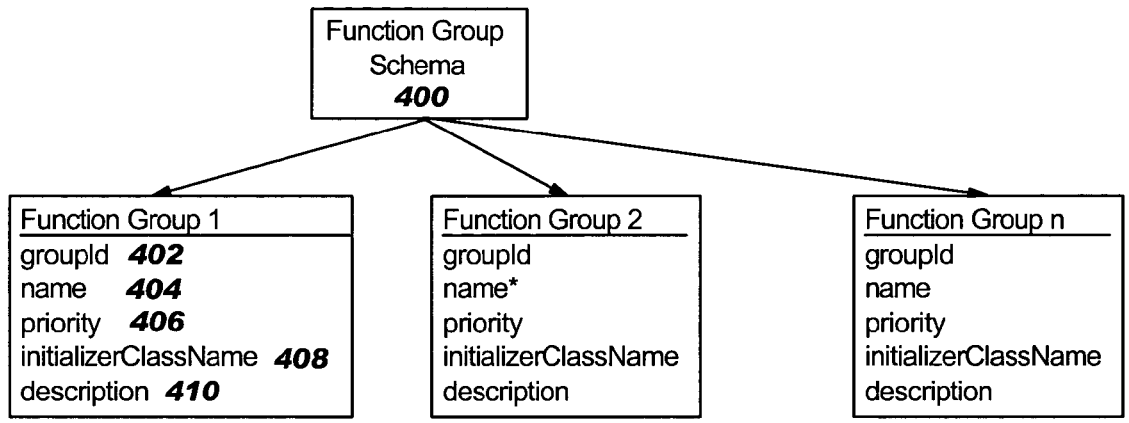

FIG. 4B

```
420
<extension
        point="com.ibm.wtp.common.functionGroup">
    <functionGroup 422
        initializerClassName="com.ibm.etools.j2ee.ws.ext.group.WSExtGroupInitializer"
        name="IBM Websphere Extensions" 424
        functionGroupID="com.ibm.ast.websphere.group" 426
        priority="10" 428
        description="Extensions to support WebSphere"> 430
    </functionGroup>
    <functinoGroupPatternBinding 432
        functionGroupID="com.ibm.ast.websphere.group" 434
        pattern="com.ibm.ast.websphere."> 436
    </functionGroupPatternBinding>
</extension>
```

| EJB Deployment Descriptor | EJB Deployment Descriptor |

TestEJBGeneric

| | |
|---|---|
| 602 ▷ General Information | ▷ Usage |
| 604 ▷ Enterprise JavaBeans | ▷ Assembly Descriptor |
| 606 ▷ References | ▷ Ejb Client Jar |
| 608 ▷ Relationships 2.0 | ▷ Icons |
| 610 ▷ Visualization | |

620

| EJB Deployment Descriptor | EJB Deployment Descriptor |

TestEJBWAS

| | |
|---|---|
| ▷ General Information | ▷ Usage |
| ▷ Enterprise JavaBeans | ▷ Assembly Descriptor |
| ▷ References | ▷ Ejb Client Jar |
| ▷ Relationships 2.0 | ▷ Icons |
| ▷ Visualization | |
| 622 ▷ WebSphere Extensions | |
| 624 ▷ WebSphere Bindings | |

METHOD AND APPARATUS FOR IMPLEMENTING DYNAMIC FUNCTION GROUPS IN A DATA PROCESSING SYSTEM

BACKGROUND OF THE INVENTION

1. Technical Field

The present invention relates to an improved data processing system. In particular, the present invention relates to extending functions, such as actions, operations, or user interfaces, in a software application. Still more particular, the present invention relates to implementing dynamic function groups in a software application.

2. Description of Related Art

In an extendable software application, such as the Eclipse Platform, third party vendors may provide additional services to the user through extensions, which are often referred to as "plugins". The Eclipse platform is an open source platform for product development. Plugins allow a third party vendor to add additional functionalities or extended sets of functionalities (ESFs) to a software application. An Extended Set of Functionality is a collection of contributions associated with the same logical purpose.

In order to use these plugin extensions to perform extended functionalities, end-users choose which plugins to install to their environment. In general, plugins which the end-user installs are always on or always off. This 'always-on' or 'always-off' approach limits the enabling and disabling of extended functionalities to the plugin extensions as a whole. Thus, end-users may not choose particular set of functionalities to enable or disable by default. Vendors that require this flexibility would be required to provide some other mechanism to enable or disable their extensions.

In addition, if another third party vendor contributes similar functionalities to the software application, these functionalities must co-exist with other functionalities since there is no predescribed system that handles enablement of third party vendor contributions. The co-existence forced on the end-user may or may not make sense depending on the software application and can potentially clutter the Graphical User Interface with extensions that are not directly relevant to the end-user.

For example, in an enterprise software development environment focused on J2EE application development, a software developer may write software that needs to run on J2EE Application Servers from two separate vendors, such as BEA WebLogic Server, a product available from BEA Systems, Inc., and WebSphere Application Server, a product available from International Business Machines Corporation. In an extendable software application which allows plugin extensions and provides for no coordination between those extensions, the user may see both BEA and IBM content for the same project, including menu actions, editor pages, wizard pages, and toolbar contributions, even though the particular project is only targeted for one of the two possible J2EE Application Servers.

Furthermore, in order to provide a consistent and focused environment for the end-user, each vendor must provide custom mechanisms to enable or disable their functionality, which can make integration of similar types of functionalities difficult.

One approach to alleviate the problem of co-existence and granularity of functions is for each individual vendor to integrate a mechanism that dynamically determines whether a contributed functionality is enabled or disabled in the software application. However, this approach can lead to code duplication, since each contributing third party vendor has to provide their own dynamic determination mechanism. Thus, extra code that is unrelated to the contributed functionality has to be integrated to each vendor's contributions.

Furthermore, each contributing vendor has to handle their own collection of functionalities, generally by integrating the code into the added functionalities themselves. With no mechanism to coordinate individual contributions from third parties, vendors cannot communicate a relative priority to indicate to the software application how to display or choose which functionalities to use or present to the user.

Another approach attempts to resolve the problem of co-existence and prevention of cluttered user interface, by selectively revealing user interface elements to the user based on a defined user role or user behavior. However, this selective mechanism focuses enabling and disabling functionalities based on user actions, not on the vendor content or a project state where project is a collection of editable artifacts. It would be desirable to have even tighter consistency and usability focused on the specific end-user.

Therefore, it would be advantageous to have an improved method, apparatus, and computer instructions to dynamically enable and disable multiple third party contributed functionalities within a software application without the disadvantages of prior art described previously.

BRIEF SUMMARY OF THE INVENTION

The present invention provides a method, an apparatus, and computer instructions for implementing dynamic function groups. The present invention detects a definition of a set of functionalities in a function group provided by a vendor to an extendable software application, and identifies an item contributed in the software application through an extension point. Subsequently, the mechanism of the present invention identifies other extension points corresponding to the item that includes a plurality of function groups.

The mechanism of the present invention then determines based on the definition of each function group within the plurality if a condition of the extendable software application is satisfied. If the condition is satisfied, the set of functionalities of the corresponding function group is enabled in the extendable software application. If the condition is not satisfied, the set of functionalities of the corresponding function group is disabled in the extendable software application.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A is a diagram illustrating an exemplary function group schema in accordance with a preferred embodiment of the present invention;

FIG. 4B is a diagram illustrating an exemplary implementation of an extensible point is depicted in accordance with a preferred embodiment of the present invention;

FIG. 6 is a diagram illustrating an exemplary implementation of dynamic function groups in a user software development environment in accordance with a preferred embodiment of the present invention.

DETAILED DESCRIPTION OF THE INVENTION

Figure 1:
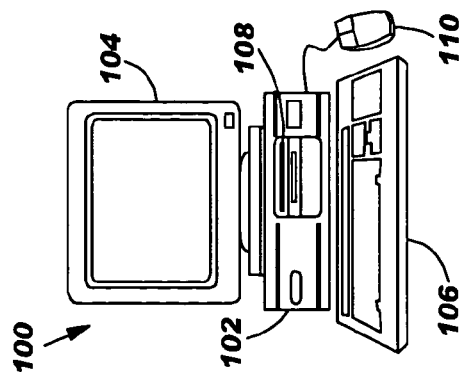
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
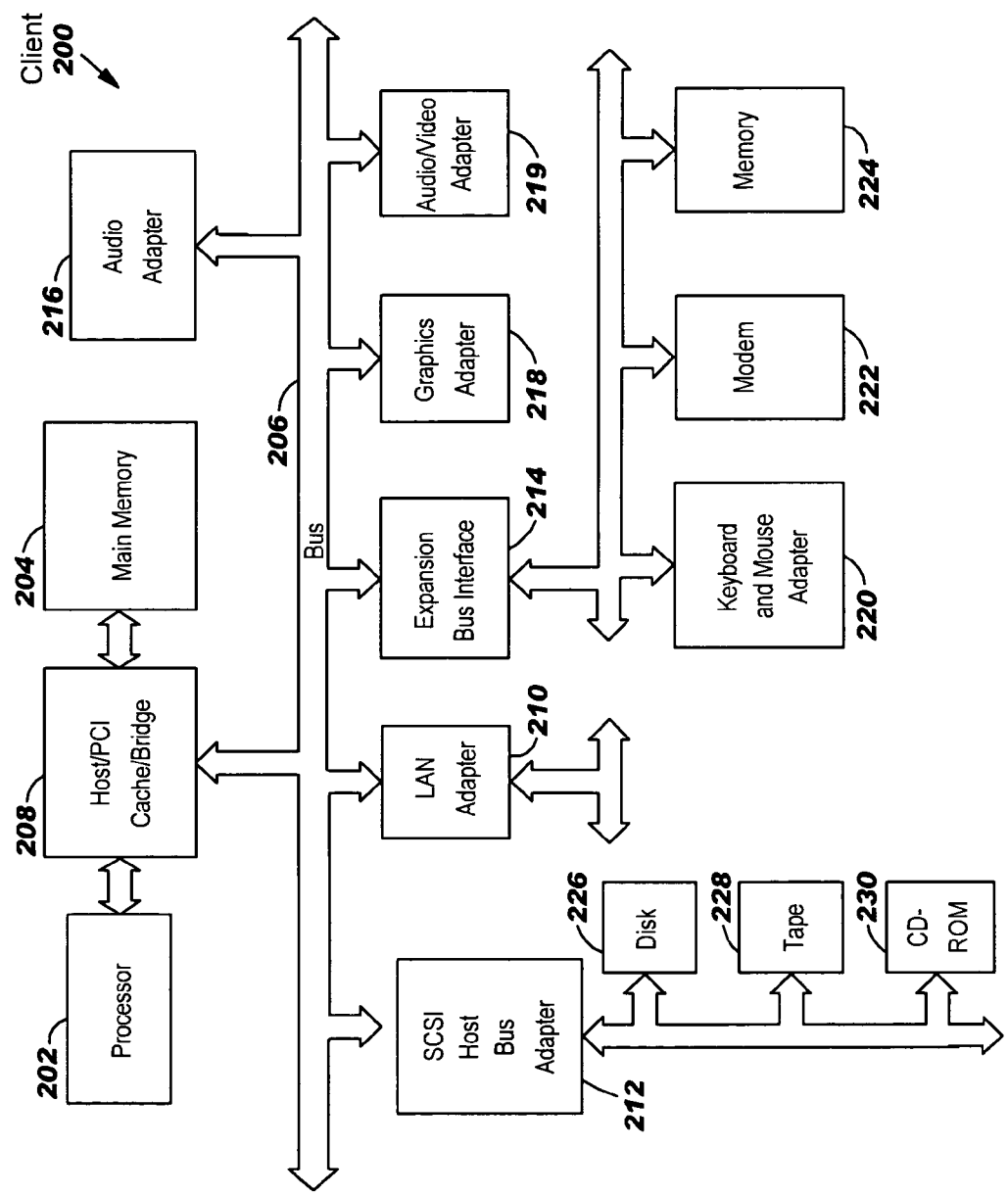
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, an apparatus, and computer instructions for implementing dynamic function groups in an end-user software application. In a preferred embodiment, mechanisms of the present invention may be implemented in an extendable software application, such as the Eclipse Platform. A software application may be implemented as computer instructions executed by the processor of the data processing system, such as processor 202 of data processing system 200 in FIG. 2.

In a preferred embodiment, the present invention provides a set of function groups, which amalgamates extended sets of functionalities by a specific vendor or purpose and allows those functionalities to be dynamically enabled or disabled within a software application. With function groups, the software application may better satisfy the needs of the user and provides better usability.

Function groups provide a consistent and streamlined user interface targeted to the end-users task at hand based on a project state. Other types of conditions or contexts may also be used to focus the targeted sets of functionalities without departing the scope and spirits of the present invention.

For example, an end-user may use an Integrated Development Environment (IDE) focused on enterprise application development. The end-user may have projects that are targeted to a Websphere Application Server. Thus, the user interface shows actions, operations, and user interface elements that are only relevant to a Websphere Application Server. The user may also have Apache Tomcat projects that target an Apache Tomcat Server in the same IDE. With function groups, the user interface will select the appropriate editor pages, wizard pages, and menu items depending on which project the end-user is currently working within. Thus, targeted sets of functionalities may be focused based on the target server of the user software development environment.

In addition, function groups eliminate the need to duplicate code to enable or disable extended sets of functions. Since function groups may be enabled or disabled dynamically, as long as the third party vendor constructs actions, operations, and user interfaces using function groups, there is no need for each third party vendor to integrate their own code to provide their own enabling and disabling of added functionalities.

In an illustrative implementation, a function group may be defined as an extension point of an extendable software application. The extension point includes a group id, an integer based priority, a function group initializer class, and a translatable description. The group id uniquely identifies each function group so other components can reference the function groups.

The integer based priority allows contending or conflicting AOU to be sorted or overridden when presented to the user. Thus, with priority, the order of displaying editor pages, wizard pages, and the order in which operation extensions are executed may be specified by the third party vendor. Also, in situations where only one vendor provided extension can be active, and multiple extensions exist within the system, the priority can be used to determine which extension "wins". The function group initializer class provides a pluggable mechanism to determine if a function group is enabled based on the current environment settings, such as different product offerings, or the specific project characteristics, such as the target server (BEA WebLogic Server or IBM Websphere Application Server) of the project.

Whenever a function group is enabled, it remains enabled unless the state of the project or the environment changes. Thus, a third party vendor may use this pluggable mechanism to plug in a function group independent of the original development and specify whether a piece of functionality within the function group is to be enabled. In addition, selective revealing of the user interface elements may now be based on vendor content instead of only the user actions.

A separate extension point is provided in this illustrative implementation known as function group pattern binding (FGPB). A function group pattern binding associates vendor content or AOUs using the plugin identifier or extension identifier with a specific function group. By default any extensible content or functionality that is not associated with a function groups is always enabled. Alternatively, any extensible content associated with a function group is enabled only if the function group is enabled.

The separation of the extension point that defines the function group and the extension point that associates functionality with that function group allows other third party vendors to associate their content or extended sets of functionality with an existing function group without the knowledge or cooperation of the original function group provider. In this way, third party vendors no longer have to integrate code that is unrelated to the added functionalities in order to interact with existing functionalities. In addition to fine-grained function extensibility, function groups also provide an extensible framework for wizards, editors, and extensible operations. For example, in one illustrative embodiment, an extension point is defined for an extensible component. More detail regarding an implementation of an extension point is described in FIG. 4B.

When the AOU is processed, the units are sorted based on the priority of the related function groups, if any. When the content is presented to the user, the AOUs are filtered based on function group enablement and sorted by priority. Each AOU is then inserted into the user interface at the relevant places where extensions are allowed.

As described above, function groups are enabled by the function group initializer class, which determines if a function group should be enabled based on the current environment settings or the specific project characteristics or any other condition. In this illustrative embodiment, the enablement is determined based on the current project in which the AOU is executing.

For wizard extensibility, the individual pages within the wizard may follow existing pages in the core wizard. For operation extensibility, extensions may be added to run before or after the core operation. For editor extensibility, there may be extensible pages and editor sections. For example, an editor may have a number of pages, including base pages, general pages, and extended pages. Each of these page types may be implemented as an extension point and sorted based on the priorities of their associated function groups. When the editor is displayed to the user, base pages may be displayed first, followed by general pages, and extended pages.

Figure 3:
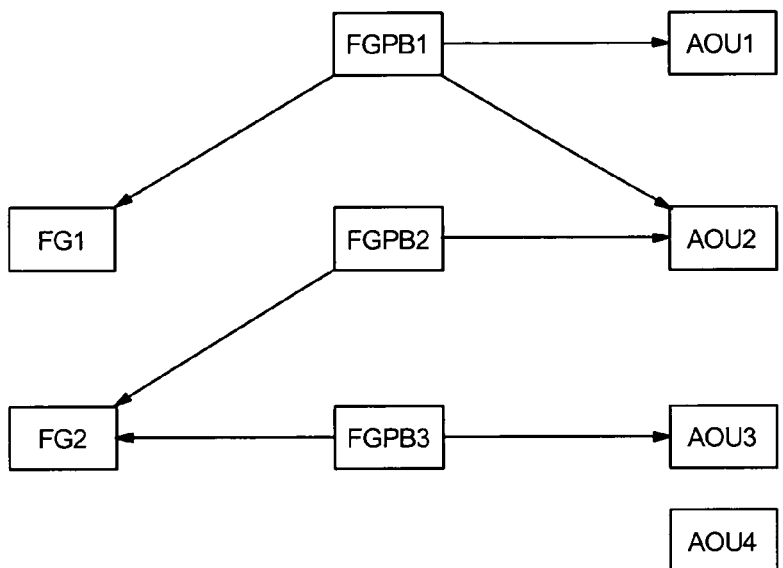
FIG. 3 is a diagram illustrating relationships between actions, operations, and user interfaces (AOUs), function groups (FGs) in accordance with a preferred embodiment of the present invention.

Turning now to FIG. 3, a diagram illustrating relationships between actions, operations, and user interfaces (AOUs), function group pattern bindings (FGPBs), and function groups (FGs) is depicted in accordance with a preferred embodiment of the present invention. As depicted in FIG. 3, AOU1, AOU2, AOU3, and AOU4 are items that may be extended or contributed in an extendable software application. AOU1, AOU2, AOU3, and AOU4 are identified by a plugin or extension id.

For each AOU, zero or more function group pattern bindings (FGPBs) may be associated. FGPBs associate content, such as AOU1, AOU2, AOU3, and AOU4 with different available function groups. In this example, AOU1 is only associated with FGPB1, while AOU2 is associated with both FGPB1 and FGPB2. Similarly, AOU 3 is only associated with FGPB2, while AOU4 is not associated with any PGPB.

While each FGPB is only associated to a single function group, a function group may be associated with one or more FGPBs. In this example, FG1 is only associated with FGPB1, while FG2 is associated with FGPB2 and FGPB3. More details regarding function groups FG1 and FG2 are described in FIG. 4A.

By default, an AOU is always enabled if it is not associated with a function group, for example AOU4. However, an AOU is enabled if any of its associated function group is also enabled. For example, if FG1 is enabled, both AOU1 and AOU2 are enabled while AOU3, which is not associated with FG1, is disabled. Similarly, if FG2 is enabled, AOU2 and AOU3 are enabled while AOU1, which is not associated with FG2, is disabled.

Turning now to FIG. 4A, a diagram illustrating an exemplary function group schema is depicted in accordance with a preferred embodiment of the present invention. As depicted in FIG. 4A, the structure of each function group, such as function group FG1 and FG2 in FIG. 3, adhere to function group schema 400.

In this illustrative example, each function group, such as function group 1, has a number of attributes. These attributes include group id 402, name 404, priority 406, initializer class name 408, and description 410. Group id 402 identifies the individual function group. Name 404 identifies the name of the individual function group. Description 410 describes the individual function group.

Priority 406 identifies a priority value of function group 1 in relation to other function groups. Priority 406 allows conflicting or contending AOU to be sorted or overridden when the AOU is presented to the user. Also, priority provides organization of editor pages, wizard pages, and operation extensions execution.

Initializer class name 408 identifies the name of function group initializer class, which determines whether an individual function group should be enabled. The enablement is based on current environment settings, specific project characteristics, or any other conditions. Function group initializer class also monitors for state changes or condition changes in the extendable software application, such that it may dynamically enable or disable the function group as needed.

Turning now to FIG. 4B, a diagram illustrating an exemplary implementation of an extensible point is depicted in accordance with a preferred embodiment of the present invention. As depicted in FIG. 4B, in this illustrative example, extension point 420 includes attributes of function group 422 as defined by a function group schema, such as function group schema 400 in FIG. 4A.

Function group 422 has a name of "IBM WebSphere Extensions" 424 and a group ID of "com.ibm.ast.websphere-.group" 426. Function group 422 also has a priority of "10" 428 and a description of "Extensions to support WebSphere" 430. In addition to function group 422, extension point 420 also includes function group pattern binding 432.

Function group pattern binding 432 associates function group 422, which has a group ID of "com.ibm.ast.websphere-.group" 434, with an AOU whose identifier begins with "com.ibm.ast.websphere" 436.

Figure 5:
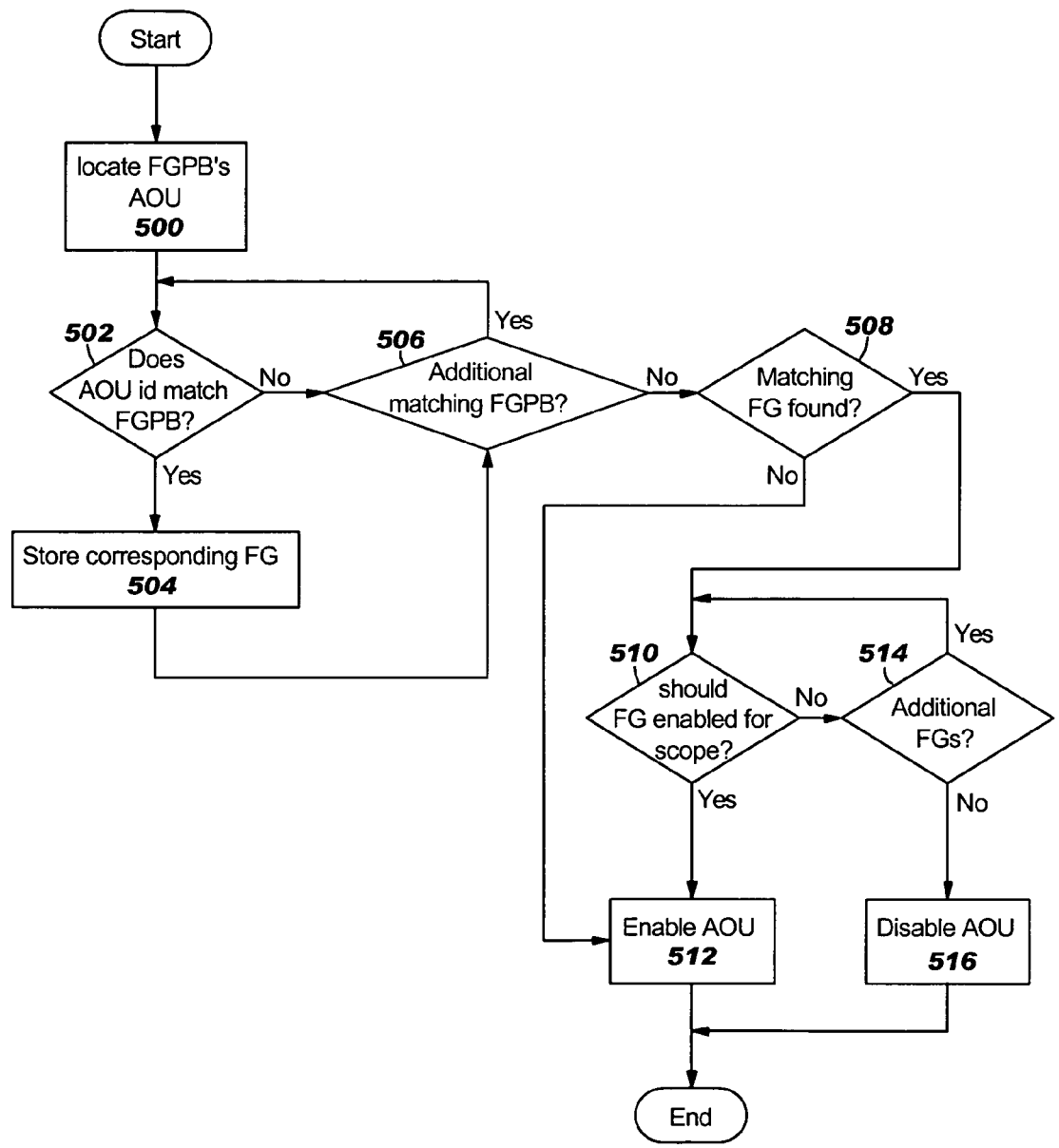
FIG. 5 is a flowchart of an exemplary process for implementing dynamic function groups in a data processing system in accordance with a preferred embodiment of the present invention.

Turning now to FIG. 5, a flowchart of an exemplary process for implementing dynamic function groups in a data processing system is depicted in accordance with a preferred embodiment of the present invention. As depicted in FIG. 5, the process begins when the mechanism of the present invention locates actions, operations, and user interfaces (AOU) that are associated with a function group pattern binding (FGPB) (step 500). The association is defined at the beginning by the third party vendor who contributes the AOU.

Next, once an associated AOU is located, the mechanism of the present invention makes a determination as to whether the AOU id matches the function group pattern binding (FGPB) (step 502). The AOU id may be on an extension or plugin id defined by the third party vendor. If a match is found, the corresponding function group of the matched FGPB is stored (step 504) and the process continues to step 506. However, if no match is found, the process continues to step 502.

At step 506, the mechanism of the present invention makes a determination as to whether additional matching FGPBs are present for the AOU. If additional matching FGPBs are present, the process returns to step 506. If no additional matching FGPBs are present, the mechanism of the present invention makes a determination as to whether a matching function group (FG) is found (step 508). The matching function group is found from the corresponding FG stored in step 504. If no matching FG is found, the process continues to step 512.

If a matching FG is found, the mechanism of the present invention invokes the function group initializer class to determine whether the function group should be enabled based on the scope of the user software application, such as current environment settings, project characteristics, or other conditions (step 510). If the function group initializer class determines that the function group should be enabled based on the scope, the mechanism of the present invention enables the AOU to be displayed or used by the user (step 512), with the process terminating thereafter.

Turning back to step 510, if the function group initializer class determines that the function group should not be enabled based on the scope, the mechanism of the present invention determines whether additional function groups are present in the stored FGs (step 514). If additional FGs are present, the process returns to step 510. If no additional FGs are present, the mechanism of the present invention disables the AOU is disabled (step 516) and the process terminates thereafter.

Turning now to FIG. 6, a diagram illustrating an exemplary implementation of dynamic function groups in a user software application is depicted in accordance with a preferred embodiment of the present invention. As depicted in FIG. 6, EJB project editor 600 includes a general information section 602, enterprise JavaBeans section 604, references section 606, relationships section 608, and visualization section 610. These sections are enabled based on the server runtime target characteristic of EJB project editor 600 being a Generic Server Target.

Contrast EJB project editor 600 with EJB project editor 620, wherein EJB project editor 620 includes two additional WebSphere sections, WebSphere extensions 622 and WebSphere bindings 624. These two additional sections are enabled based on the server runtime target characteristic of EJB project editor 620 being a WebSphere Server Target.

In summary, the present invention provides an extensible framework for third party vendors to contribute added functionalities to a extendable software application in terms of function groups. The framework allows these vendors to identify when particular extended sets of functionality are relevant and when to enable these functions. Function groups may be dynamically enabled or disabled based on current environment settings, specific project characteristics or other conditions which allow specific functionalities to be integrated by future contributors.

Also with the use of function groups, duplicate code between different vendors for enabling and disabling functionalities is eliminated. Furthermore, with the use of function groups, the framework now enables the construction of extensible wizard, editor and operation frameworks. Thus, a tight integration with extended sets of functionality may now be achieved.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for designating whether at least one functionality of at least one plug-in program is enabled with respect to an extendable software application to which the at least one plug-in program is associated, the computer implemented method comprising:

detecting a definition of a set of functionalities in a function group provided by a vendor to an extendable software application;

determining whether the at least one functionality is associated with a project targeted to a particular server environment in which a user is working using the definition of the set of functionalities, wherein the at least one functionality is part of a plug-in program for an extendable software application, wherein the plug-in program provides one or more additional services to the user using the extendable software application, and wherein the extendable software application is a software application that accepts plug-ins developed by third-party vendors;

responsive to the at least one functionality being associated with the project, enabling the at least one functionality with respect to the extendable software application; and responsive to a change in a state of the project, disabling the at least one functionality with respect to the extendable software application.

2. The computer implemented method of claim 1 wherein the at least one functionality is associated with the project, wherein the at least one functionality is part of a plurality of functionalities, and wherein the computer implemented method further comprises:

responsive to the at least one functionality being associated with the project, enabling all project functionalities within the plurality of functionalities, wherein the project functionalities comprises those functionalities within the plurality of functionalities that are associated with a particular project.

3. The computer implemented method of claim 2 further comprising: disabling all non-project functionalities within the plurality of functionalities, wherein the non-project functionalities comprises those functionalities within the plurality of functionalities that are not associated with the particular project.

4. The computer implemented method of claim 2 further comprising:

receiving a designation of a new project;

responsive to receiving, disabling the project functionalities; and responsive to receiving, enabling all new project functionalities within the plurality of functionalities, wherein the new project functionalities comprises those functionalities within the plurality of functionalities that are associated with the new project.

5. A computer implemented method for designating which of a plurality of sets of functionalities of a plurality of plug-in programs are enabled with respect to an extendable software application to which the plurality of plug-in programs are associated, the computer implemented method comprising:

detecting a definition of a set of functionalities in a function group provided by a vendor to an extendable software application;

determining whether the extendable software application is being used with respect to a project targeted to a particular server environment in which a user is working using the definition of the set of functionalities, wherein the at least one functionality is part of a plug-in program for an extendable software application, wherein the plug-in program provides one or more additional services to the user using the extendable software application, and wherein the extendable software application is a software application that accepts plug-ins developed by third-party vendors;

responsive to the extendable software application being used with respect to the project, enabling at least one set of functionalities, within the plurality of sets of functionalities, with respect to the extendable software application, wherein the at least one set of functionalities is associated with the project; and disabling all non-project functionalities within the plurality of sets of functionalities, wherein the non-project functionalities comprises those functionalities within the plurality of sets of functionalities that are not associated with the project.

6. The computer implemented method of claim 5 wherein enabling at least one set of functionalities comprises enabling a first set of functionalities associated with a first plug-in program and a second set of functionalities associated with a second plug-in program, wherein the first plug-in program and the second plug-in program are different.

7. The computer implemented method of claim 5 further comprising:

receiving a designation of a new project;

responsive to receiving, disabling the at least one set of functionalities; and responsive to receiving, enabling all new sets of project functionalities within the plurality of sets of functionalities, wherein the new sets of project functionalities comprise those functionalities within the plurality of sets of functionalities that are associated with the new project.

8. A recordable-type medium storing a computer program for designating whether the at least one functionality of at least one plug-in program is enabled with respect to an extendable software application to which the at least one plug-in program is associated, the computer program product comprising:

instructions for detecting a definition of a set of functionalities in a function group provided by a vendor to an extendable software application;

instructions for determining whether the at least one functionality is associated with a project targeted to a particular server environment in which a user is working using the definition of the set of functionalities, wherein the at least one functionality is part of a plug-in program for an extendable software application, wherein the plug-in program provides one or more additional services to the user using the extendable software application, and wherein the extendable software application is a software application that accepts plug-ins developed by third-party vendors;

instructions for, responsive to the at least one functionality being associated with the project, enabling the at least one functionality with respect to the extendable software application; and instructions for, responsive to a change in a state of the project, disabling the at least one functionality with respect to the extendable software application.

9. A recordable-type medium storing a computer program for designating which of a plurality of sets of functionalities of a plurality of plug-in programs are enabled with respect to an extendable software application to which the plurality of plug-in programs are associated, the computer program product comprising:

instructions for detecting a definition of a set of functionalities in a function group provided by a vendor to an extendable software application;

instructions for determining whether the extendable software application is being used with respect to a project targeted to a particular server environment in which a user is working using the definition of the set of functionalities, wherein the at least one functionality is part of a plug-in program for an extendable software application, wherein the plug-in program provides one or more additional services to the user using the extendable software application, and wherein the extendable software application is a software application that accepts plug-ins developed by third-party vendors;

instructions for, responsive to the extendable software application being used with respect to the project, enabling at least one set of functionalities, within the plurality of sets of functionalities, with respect to the extendable software application, wherein the at least one set of functionalities is associated with the project; and instructions for disabling all non-project functionalities within the plurality of sets of functionalities, wherein the non-project functionalities comprises those functionalities within the plurality of sets of functionalities that are not associated with the project.

10. The recordable-type medium of claim 9 further comprising:

instructions for receiving a designation of a new project;

instructions for, responsive to receiving, disabling those functionalities of the at least one set of functionalities that are not associated with the new project; and instructions for, responsive to receiving, enabling all new sets of project functionalities within the plurality of sets of functionalities, wherein the new sets of project functionalities comprise those functionalities within the plurality of sets of functionalities that are associated with the new project.

* * * * *